United States Patent
Corbett et al.

(10) Patent No.: US 10,810,967 B2
(45) Date of Patent: Oct. 20, 2020

(54) ELIMINATING REDUNDANT FIBERS IN A FEDERATED LARGE DISPLAY SYSTEM

(71) Applicant: Rockwell Collins, Inc., Cedar Rapids, IA (US)

(72) Inventors: Matthew P. Corbett, Mount Vernon, IA (US); Anthony J. Kriege, Cedar Rapids, IA (US); Eric N. Anderson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/291,406

(22) Filed: Mar. 4, 2019

(65) Prior Publication Data

US 2020/0286441 A1 Sep. 10, 2020

(51) Int. Cl.
| | |
|---|---|
| *G09G 5/00* | (2006.01) |
| *G09G 5/36* | (2006.01) |
| *G06F 3/14* | (2006.01) |
| *B65D 43/00* | (2006.01) |
| *B64D 43/00* | (2006.01) |

(52) U.S. Cl.
CPC ............ *G09G 5/006* (2013.01); *B64D 43/00* (2013.01); *G06F 3/1423* (2013.01); *G09G 5/363* (2013.01); *G09G 2370/18* (2013.01); *G09G 2370/20* (2013.01); *G09G 2380/12* (2013.01)

(58) Field of Classification Search
CPC .......... G09G 5/006; G09G 5/363; G09G 5/00; G09G 1/00; G09G 2380/12; G09G 2370/20; G09G 2370/18; G06F 3/1423; G06F 1/3218; B64D 43/00; G01C 21/36; G02B 27/01; G02B 27/0101; G02B 2027/0138; G02B 2027/0165
See application file for complete search history.

(56) References Cited

U.S. PATENT DOCUMENTS

| | | | | |
|---|---|---|---|---|
| 7,460,086 B1 * | 12/2008 | Cunningham | ........ | G06F 3/1423 345/1.1 |
| 8,743,020 B1 * | 6/2014 | Mazuk | .................... | G06F 15/00 345/1.1 |
| 9,521,374 B1 * | 12/2016 | Runge | .................... | H04N 7/181 |
| 2014/0379951 A1 * | 12/2014 | Taki | .................... | G06F 13/4068 710/303 |
| 2019/0012293 A1 * | 1/2019 | Olsen | ................ | G06F 15/17387 |

* cited by examiner

*Primary Examiner* — Maurice L. McDowell, Jr.
*Assistant Examiner* — Donna J. Ricks
(74) *Attorney, Agent, or Firm* — Suiter Swantz pc llo

(57) ABSTRACT

A federated display system includes multiple head down displays (HDD) driven by two or more display processing computers (DPC). Each DPC includes two or more display nodes independently managing display processing, graphics generation, and I/O functionality (either within a single processing unit or a multiprocessor environment). Each display node is linked to a mezzanine control plane (MCP) independent of the display nodes, which MCP includes dedicated optical channels to each member HDD of the system and a switching fabric to control the routing of graphical signals from the graphics generators of each node to the optical channel connected to the desired target HDD. The switching fabric includes a master selector for designating any node of a DPC as a master node capable of controlling the switching fabric via its processing control or graphics generation functions.

7 Claims, 2 Drawing Sheets

ELIMINATING REDUNDANT FIBERS IN A FEDERATED LARGE DISPLAY SYSTEM

BACKGROUND

Cockpit-based head down display (HDD) systems may incorporate multiple sources and multiple destinations, e.g., multiple processors (display processors, graphics processors) and multiple display devices linked by fiber optic cables and providing high-speed high-resolution enhanced video display (e.g., enhanced vision, synthetic vision) customizable across the various display surfaces. These complex HDD systems may incorporate images and visual data from a variety of sources (e.g., sensor-based navigational and environmental data as opposed to information received from external sources and displayed in visual form, such as terrain data retrieved from databases or traffic information transmitted by ground-based facilities). Alternatively, or additionally, these systems may necessarily incorporate some degree of redundancy; certain components may fail without interrupting full display functionality. Such systems may be complex, expensive, and heavy. It may be possible to minimize fiber redundancy by routing and merging image data from multiple graphic sources. However, such a solution, while flexible, fails to preserve independence across individual processing nodes. For example, should a graphics processor fail one or more fiber outputs may still be lost, impeding full functionality.

SUMMARY

In one aspect, embodiments of the inventive concepts disclosed herein are directed to a federated display system that minimizes fiber redundancy while maintaining display node independence by moving fiber optical data links (ODL) into a separate mezzanine control panel (MCP) to reduce weight, cost, and complexity. The federated display system includes a group of head down displays (HDD) driven by two or more display processing computers (DPC). Each DPC includes two or more independent nodes; for example, each node may include independent display processing, graphics generation, and input/output (I/O) control functionality, either within a single processing unit or a multiprocessor environment. The graphics generation functions are responsible for generating image streams (which may include, e.g., enhanced vision and/or synthetic vision) based on external input received from external sources by the I/O control logic. All independent nodes within a DPC are linked to a mezzanine control plane (MCP), which control plane includes a dedicated optical channel to each individual HDD of the system (e.g., such that a particular node may drive one or more HDDs). Switching fabric within the MCP controls the routing of signals from a particular graphics generator (e.g., any graphics generator within a given DPC) to the desired optical channel and HDD. The switching fabric may be controlled by any node of a DPC acting as, or designated as, a master node.

In embodiments, the optical channels include one or more fiber optical data links (ODL).

In embodiments, the optical channels are ARINC 818 compatible optical channels.

In embodiments, designation of a node within a DPC as a master node is administered by a master selector within the switching fabric.

In embodiments, control of the switching fabric is administered via any processing controller or graphics generator, e.g., the processing controller or graphics generator of the current master node.

In embodiments, the switching fabric directs fiber input to any node-based graphics generator of a DPC.

In embodiments, the external sources include aircraft sensors (e.g., atmospheric sensors, navigational sensors), cameras, and communications links.

In embodiments, the federated display system is embodied aboard an aircraft or similar mobile platform.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
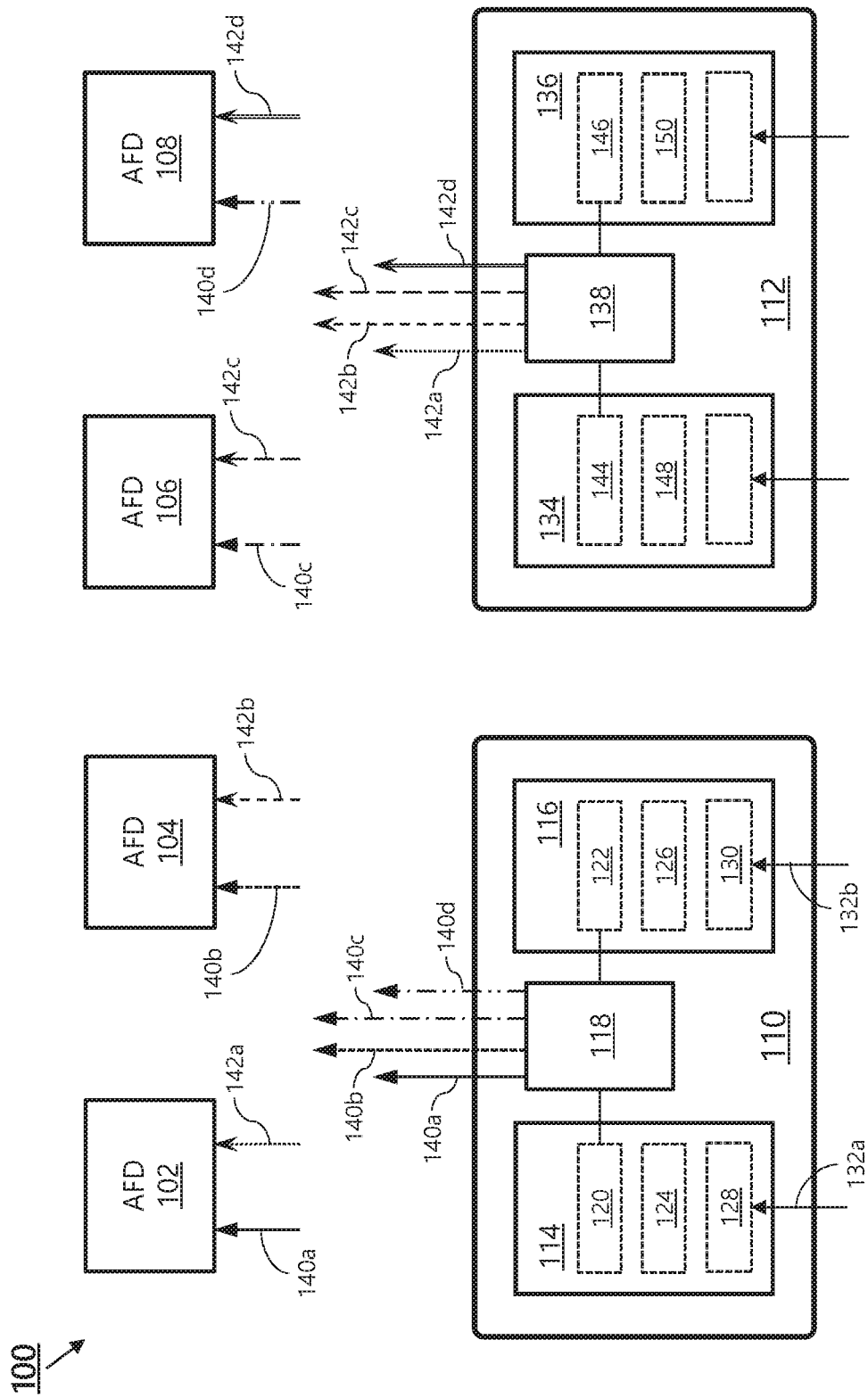
FIG. 1 illustrates an exemplary embodiment of a federated display system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a federated display system that minimizes fiber redundancy by moving fiber optical data links (ODL) out of the individual display nodes and into a separate mezzanine board, preserving the independence of each display node while significantly reducing weight, cost, and complexity overall.

Referring to FIG. 1, an exemplary embodiment of a federated display system 100 according to the inventive concepts disclosed herein may include head down display (HDD) units 102, 104, 106, 108, and display processing computers (DPC) 110, 112. For example, the HDD units 102-108 may be adaptive flight display (AFD) units embodied in the cockpit of an aircraft or like mobile platform; the HDD units 102, 104 may be left-side displays, and the HDD units 106, 108 may be right-side displays, convertible by a pilot or co-pilot for a broad variety of functions as needed or desired, e.g., flight control, enhanced vision, synthetic vision, navigational display. For example, the DPC 110 may include two (or more) independent nodes, e.g., an "A" node 114 and a "B" node 116, connected to a separate mezzanine board 118. Both the "A" node 114 and the "B" node 116 may include processing functions 120, 122 (e.g., display processing) and graphics functions 124, 126 (e.g., graphics processing and generation) for driving the HDD units 102, 104, 106, 108 as well as input/output (I/O) functions 128, 130 (e.g., controllers). Within either node 114, 116, the processing functions 120, 122, graphics functions 124, 126, and I/O functions 128, 130 may be integrated in a single processing environment or distributed across two or more discrete processing units. For example, the I/O controllers 128, 130 may receive external input data 132a-b from aircraft sensors (e.g., atmospheric sensors, navigational sensors), cameras/image sensors, communications links, and other sources external to the DPC 110. The graphics generators 124, 126 may generate image content (e.g., video, enhanced vision, synthetic vision) based on the external input data.

Similarly to the DPC 110, the DPC 112 may include independent nodes 134, 136 and mezzanine board 138 (e.g., mezzanine control plane (MCP)). Rather than connect (e.g., via ARINC 818 fiber ODL) each node 114, 116, of the DPC 110 (and each node 134, 136 of the DPC 112) to each HDD 102-108 individually, the mezzanine boards 118, 138 each include fiber optic interfaces 140a-d and 142a-d respectively linking the mezzanine boards to each HDD 102, 104, 106, 108 (e.g., via optical channel or ODL). The elimination of redundant fiber optic harnesses and ODLs (e.g., from 2n to n ODLs for any group of n HDDs) provides for reduced size, weight, power, and cost (SWaP-C) of the federated display system 100; additionally, as the mezzanine boards 118, 138 have a significantly higher mean time between failures (MTBF) as opposed to either the processing functions 120, 122, 144, 146 or graphics functions 124, 126, 148, 150.

The mezzanine boards 118, 138 may each include switching fabrics with control logic for directing outputs from each graphics function or generator (124, 126, 144, 146) to any of the HDDs 102-108 via a particular optical channel or fiber optic interface 140a-d, 142a-d. Consequently, if any individual node 114, 116, 134, 136 should fail, full functionality of all four HDDs 102-108 is not impeded. In order to preserve the independence of each node 114, 116, 134, 136 within the system 100, the switching fabric within each mezzanine board 118, 138 may be controllable by any processing function (120, 122, 144, 146) or graphics function (124, 126, 148, 150) within either DPC 110, 112. For example, within the DPC 110, the switching fabric of the mezzanine board 118 may be controllable by either display function 120, 122 or by either graphics function 124, 126 of either node 114, 116; similarly, the switching fabric of the mezzanine board 138 (connecting nodes 134 and 136) may be controllable by either display function 144, 146 or either graphics function 148, 150.

Figure 2:
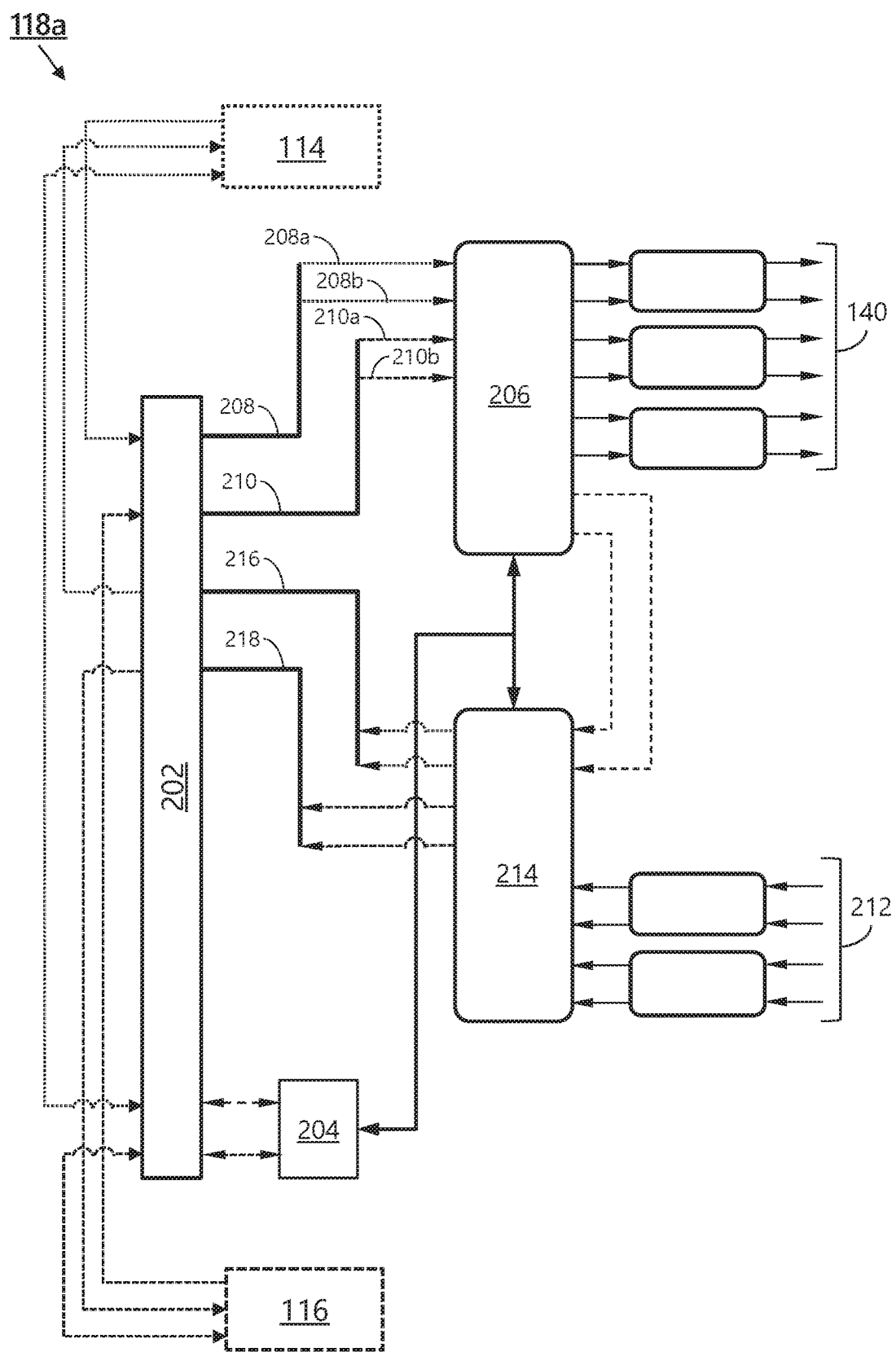
FIG. 2 illustrates an exemplary embodiment of the mezzanine switching fabric of FIG. 1.

Referring to FIG. 2, the mezzanine board 118a may be implemented and may function similarly to the mezzanine boards 118, 138 except that the mezzanine board 118a may be selectably controllable by either independent node (114, 116; FIG. 1) of the DPC (110, FIG. 1), particularly by either display function (120, 122; FIG. 1) or graphics function (124, 126; FIG. 1). This selectable mastering may be implemented in a variety of ways, including but not limited to that shown by FIG. 2. For example, a high-speed differential connector 202 (e.g., HM-Zd) may manage inputs and outputs from and to the independent nodes 114, 116 while a master selector 204 (e.g., inter-integrated circuit or I$^2$C compatible) designates either independent node 114, 116 as a master node, e.g., currently in control of distributing graphics output from the graphics functions (124, 126, 148, 150; FIG. 1) to the HDDs (102-108; FIG. 1), e.g., via the fiber ODLs 140 connected to the differential connector 202 via crosspoint switch 206.

For example, left-side outputs 208, 208a-b may carry graphical output from the graphics function 124 of the node 114 and right-side outputs 210, 210a-b may carry graphical output from the graphics function 126 of the node 116. Similarly, inputs to the DPC 110 via fiber ODLs 212 (e.g., ARINC 818 input) may be directed through the crosspoint switch 214, where left-side inputs 216 intended for the graphics function 124 or processing function processor 120 are directed to the node 114 and right-side inputs 218 intended for the graphics function 126 or processor function 122 are directed to the node 116.

As will be appreciated from the above, systems and methods according to embodiments of the inventive concepts disclosed herein may reduce size, weight, and cost factors associated with a federated display system by reducing the necessary fiber ODLs and fiber optic harnesses while maintaining the independence of DPC internal nodes. Consequently, full functionality is not impeded by a node failure. Similarly, as the fiber mezzanine boards have a higher MTBF than the DPC internal node components, fiber availability is minimally impacted.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A federated display system, comprising:
  a plurality of head down displays (HDD) including a first HDD and at least one second HDD;
  and
  at least two display processing computers (DPC), each DPC comprising:
    a plurality of independent nodes including a first node and at least one second node, each independent node including one or more processors and comprising one or more of:
      a processing controller;
      a graphics generator coupled to the processing controller, the graphics generator configured to generate at least one image stream based on external input;
      and
      input/output (I/O) control logic coupled to the graphics generator and to an external source, the I/O control logic configured to receive the external input from the external source;
    and
    at least one mezzanine control plane communicatively coupled to each independent node, the mezzanine control plane comprising:
      a plurality of optical channels including at least a first optical channel optically coupling the mezzanine control plane to the first HDD and at least one second optical channel optically coupling the mezzanine control plane to the second HDD;
      and
      a switching fabric configured to route graphical output from the graphics generator to at least one of the first optical channel and the at least one second optical channel, the switching fabric controllable by either the first node or the at least one second node and including at least one master selector configured to designate one of the first node and the at least one second node as a master node.

2. The federated display system of claim 1, wherein the plurality of optical channels includes at least one optical data link (ODL).

3. The federated display system of claim 1, wherein the plurality of optical channels includes at least one ARINC 818 compatible optical channel.

4. The federated display system of claim 1, wherein the fiber switching fabric is controllable by at least one of:
  a first processing controller of the first node;
  a first graphics generator of the first node;
  a second processing controller of the at least one second node;
  and
  a second graphics generator of the at least one second node.

5. The federated display system of claim 4, wherein the switching fabric is configured to direct at least one fiber input to at least one of the first graphics generator and the second graphics generator.

6. The federated display system of claim 1, wherein the external source includes at least one of an aircraft-based sensor, a camera, an image sensor, a navigational sensor, and a communications link.

7. The federated display system of claim 1, wherein the display system is embodied aboard a mobile platform.

* * * * *